United States Patent Office.

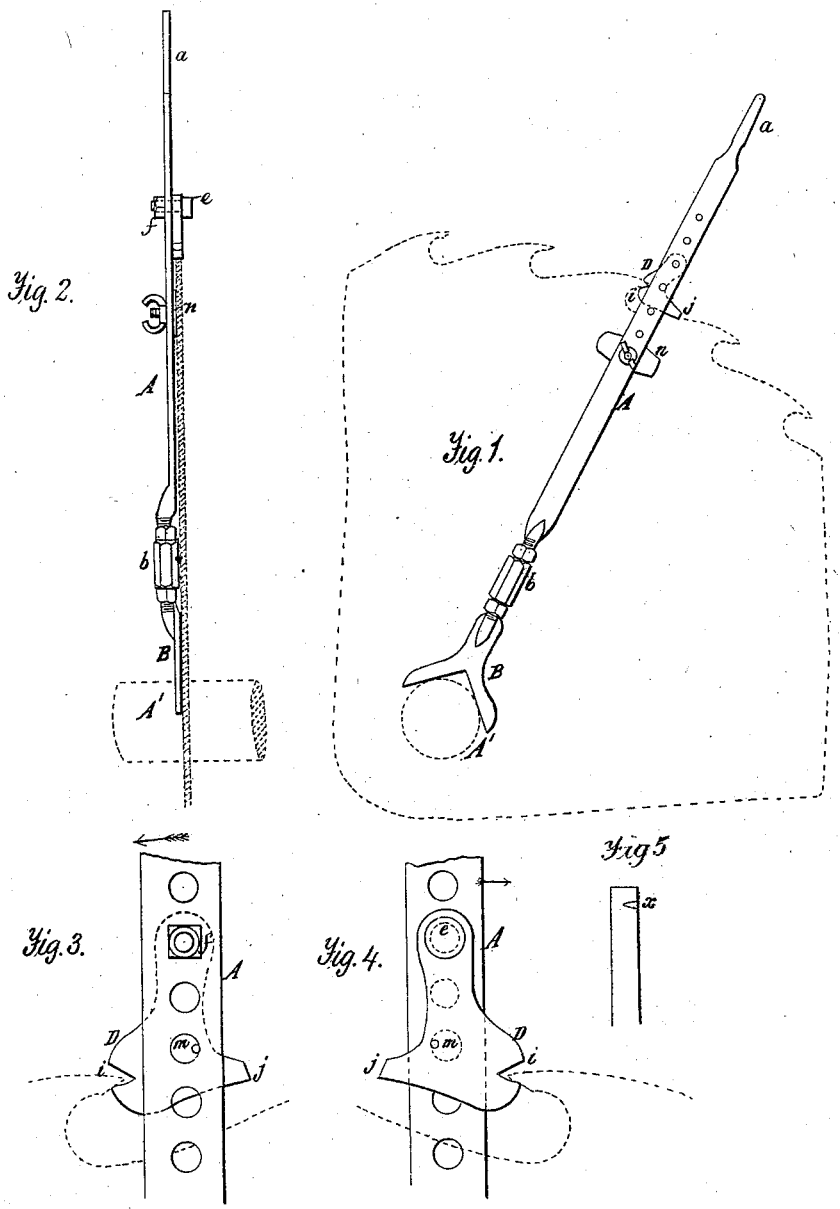
J. G. Baker.
Saw Set.
Nº 79,184.    Patented Jun. 23, 1868.

JOHN G. BAKER, OF PHILADELPHIA, PENNSYLVANIA, ASSIGNOR TO HENRY DISSTON, OF SAME PLACE.

*Letters Patent No. 79,184, dated June 23, 1868.*

---

IMPROVEMENT IN SWAGE FOR CIRCULAR SAWS.

---

*The Schedule referred to in these Letters Patent and making part of the same.*

---

TO ALL WHOM IT MAY CONCERN:

Be it known that I, JOHN G. BAKER, (assignor to Henry Disston,) of Philadelphia, Pennsylvania, have invented an Improved Instrument for Setting and Trueing the Teeth of Circular Saws; and I do hereby declare the following to be a full, clear, and exact description of the same.

My invention consists of an improvement, fully described hereafter, in the instrument for setting up and trueing the teeth of circular saws, for which Letters Patent were granted to Henry Disston on the 5th day of November, 1867.

In order to enable others skilled in the art to make and use my invention, I will now proceed to describe the mode of constructing and using the same, reference being had to the accompanying drawing, which forms a part of this specification, and in which—

Figure 1 is a front view of my improved instrument for setting the teeth of circular saws.

Figure 2, an edge view of the same.

Figure 3, an enlarged view of part of the instrument.

Figure 4, the reverse of fig. 3; and

Figure 5 represents the edge of a saw-tooth operated on by the instrument.

A is a metal bar, on the upper end of which is formed a suitable handle, $a$, the lower end being connected, by an adjustable screw-coupling, $b$, to the fork B, which, when the instrument is in use, rests against the edge of the central washer or collar A' (shown by red lines) of a circular saw.

In the bar A are a number of holes, into any desired one of which can be fitted a pin, $e$, secured by a nut, $f$, and to this pin is hung loosely a swage, D, of the form or approximating to the form represented in the drawing; the front of this swage having a notch, $i$, as shown in figs. 3 and 4, and the rear having a projection conveniently arranged for receiving the blow of a hammer.

This swage has a small pin, $m$, projecting through one of the holes in the bar A, within which the said pin has a limited play.

It is most important in circular saws that the points of all the teeth should be set at the same distance from the centre of rotation. In order to insure this, I use the above-described instrument in the following manner: I select a tooth, the point of which is furthest from the centre of the saw, and so adjust the bar A that the notch of the swage will coincide with this tooth when the fork B is resting on the edge of the washer or collar of the spindle; I then apply the swage to the next tooth, which is nearer to the centre of the saw than the first, forcing the bar A in the direction of the arrow, fig. 3, so that the pin $m$ bears against the edge of the opening in the bar furthest from the notch of the swage. While the bar is thus tightly held in this position, I strike the projection $j$ of the swage repeated blows with a hammer, when, as will be readily seen by referring to fig. 3, the point of the tooth will be struck outward from the centre of the saw's rotation until it coincides with the notch of the swage, when it will be at the same distance from the centre of the saw as the first tooth; and tooth after tooth is thus operated on until the setting up has been completed.

A plate, $n$, is secured to the bar A, and this plate rests against the blade of the saw, and prevents all lateral twisting of the bar.

It will be seen, on reference to fig. 3, that the swage acts on the tooth at a short distance from its extreme point, and that an indentation must be made where the swage is forcibly struck against the bevelled under side of the tooth.

If the edge of the tooth is not at right angles to the face of the blade, this indentation will not generally be entirely across the edge, but will appear as shown at $x$, fig. 5, or if it should be entirely across the edge, it will be deeper at one face of the blade than at the other. The indentation thus serves as a guide to direct the filer of the saw, who, when operating on the bevelled under side of the tooth, can, by observing the indentation, so file across the same that it will be at right angles to the faces of the blade, the importance of which is well known to those familiar with the operation of circular saws.

In the aforesaid patent of November 5, 1867, the swage, although made adjustable on the bar or bars, was secured to the same when the instrument was used. In the present improvement, however, the swage is hung loosely to the bar, and its movement, independently of the same, is limited by its pin entering a hole in the bar, which hole is larger than the pin.

Owing to this limited independent movement of the swage, the latter can be struck against the point of the tooth without the force of the blow being transmitted to the bar.

I claim as my invention, and desire to secure by Letters Patent—

1. A bar, A, adapted at its lower end to or arranged to embrace the collar, washer, or spindle of a circular saw, in combination with the swage D, hung loosely to the said bar, but having its movement on the same limited, all substantially as and for the purpose herein set forth.

2. In combination with the said bar, I claim a plate, $n$, for fitting against the face of the saw-blade, as described.

In testimony whereof, I have signed my name to this specification in the presence of two subscribing witnesses.

JOHN G. BAKER.

Witnesses:
A. H. SHOEMAKER,
JOHN COX.